(No Model.)

W. H. WILDE.
WHEEL PLOW.

No. 254,418.  Patented Feb. 28, 1882.

WITNESSES
Fred. G. Dieterich
P. C. Dietrich

INVENTOR
William H. Wilde
per: W. B. Richards
Attorney.

UNITED STATES PATENT OFFICE.

WILLIAM H. WILDE, OF BUSHNELL, ILLINOIS.

WHEEL-PLOW.

SPECIFICATION forming part of Letters Patent No. 254,418, dated February 28, 1882.

Application filed September 29, 1881. (No model.)

*To all whom it may concern:*

Be it known that I, WILLIAM H. WILDE, a citizen of the United States, residing at Bushnell, in the county of McDonough and State of Illinois, have invented certain new and useful Improvements in Wheel-Plows, of which the following is a specification, reference being had therein to the accompanying drawings.

The nature of my invention relates to improvements in wheel-plows; and the invention consists in the use of a spring connected with the plow-gang and lifting-lever in such manner that the spring may be utilized to aid in raising the plow from the ground; may be locked by the lifting-lever, so as to exert no force on the plow when in operation, and to permit the plow to rise and fall freely independently of the lifting-lever and spring; and which may be locked so as to exert no force on the plow, while the lifting-lever is locked to hold the plow firmly in the ground.

The invention further consists in constructions and combinations hereinafter fully described, and set forth in the claims hereto annexed.

Figure 1:
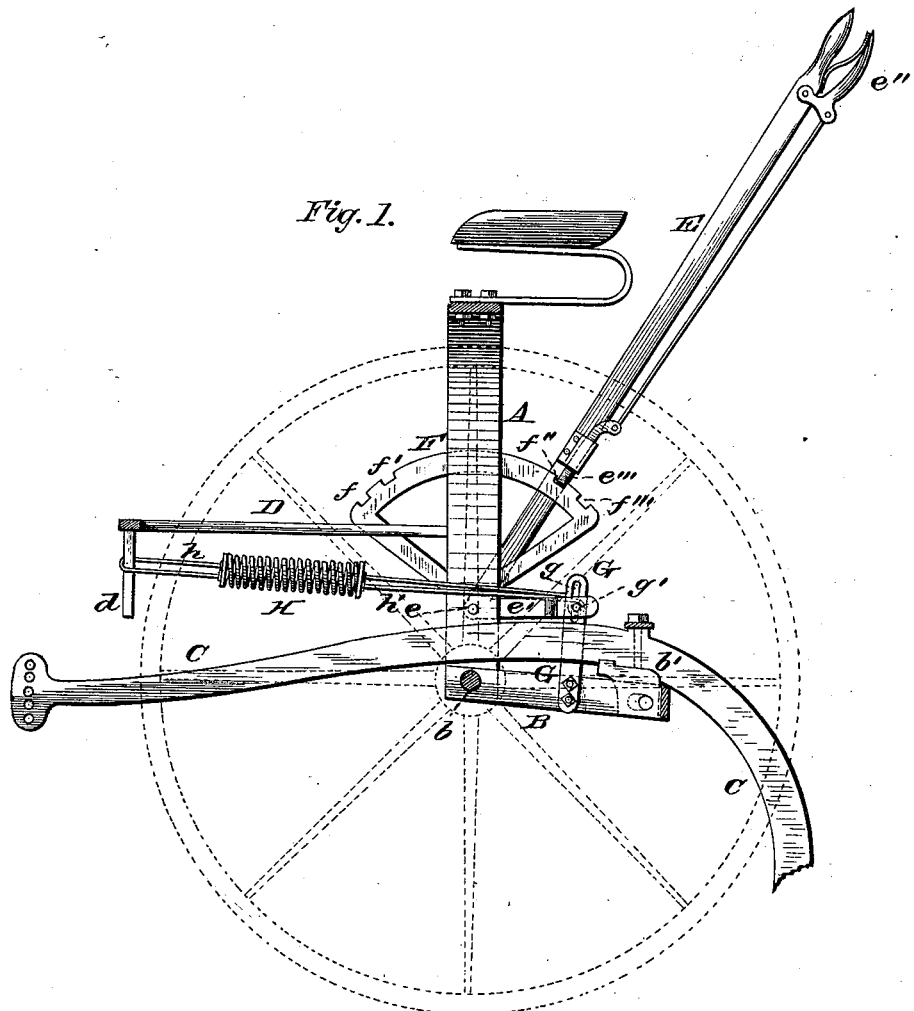
Figure 2:
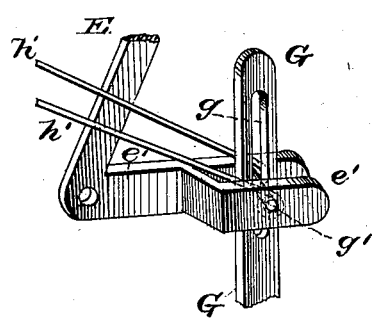

In the accompanying drawings, which illustrate my invention, and in which the several parts are indicated by the same symbol or reference-letter, Figure 1 is a vertical sectional elevation. Fig. 2 is a perspective showing the connection of the spring and lifting-lever with the slotted bail-standard.

Referring to the drawings by letters, letter A represents the arched axle of an ordinary wheel or sulky plow; B, an ordinary bail hinged to the axle at $b$, and hinged to the plow-beam at $b'$ in any ordinary manner that will permit the bail to swing in a vertical plane to raise and lower the plow.

C is an ordinary plow-beam, the plow not shown.

D is an ordinary bow projecting forward from the axle, and has a pendant, $d$, from its front side.

E is an ordinary hand-lever, pivoted to the axle at $e$, and has an arm, $e'$, extending back from its lower end for lifting the plow. The lever E is provided with the ordinary thumb-latch, $e''$, and catch $e'''$.

F is a segment-bar secured to the axle, and provided with notches $f f'$ at its front end and notches $f'' f'''$ at its rear end.

G is a standard projecting upward from the side of the bail B, and has a slot, $g$, lengthwise of itself in its upper end. The arm $e'$ is preferably bifurcated at its rear end and receives the standard G between its limbs. It may, however, be constructed otherwise, if desired. A journal-bolt, $g'$, passes through the outer end of the arm $e'$ and through the slot $g$ in the standard G.

H is a spring, from which rods $h$ extend forward and connect it with the pendant $d$, and other rods, $h'$, from which extend rearward and connect it with the journal-bolt $g'$ or any part of the rear end of the arm $e'$. The spring H is arranged so as to exert a pulling force on the arm $e'$.

The operation is as follows: When the catch $e'''$ is engaged in the notch $f'''$, as shown by full lines in the drawings, the lever E and arm $e'$ will be held in the positions shown, with the journal-bolt $g'$ about mid-length of the slot $g$. The entire force of the spring H will then be exerted on the locked lever E, and none of its force whatever can be exerted on the bail B or plow-beam, and the plow-beam and plow will be free to rise and fall independent of the spring and lifting-lever, the slot $g$ moving freely on the journal $g'$. By moving the lever E backward so that the catch $e'''$ may be engaged with the notch $f''''$, the journal-bolt $g'$ will be brought in contact with the lower end of the slot $g$, and thus hold the plow firmly down in the ground, as is desirable in some kinds of land. While the plow is locked down, as last described, the spring is again inoperative on the plow and exerts its force on the locked lever. To raise the plow entirely free from and above the ground, the lever E may be thrown forward so as to engage the catch $e'''$ with either of the notches $f$ or $f'$. In throwing the lever forward, as last described, the journal $g'$ will come in contact with the upper end of the slot $g$, and the full force of the spring will then act and aid in raising the plow.

The spring H may be a spiral spring, as shown, or it may be of any other construction, and may be attached at its forward end to the pendant $d$, as shown, or to the axle itself or any projection therefrom.

What I claim as new is—

1. In a wheel-plow, in combination with the axle or frame, bail, and plow, a spring connected with the axle or frame or a projection therefrom at one end, and with the bail at its other end by a slotted connection, whereby it may be utilized in lifting the plow, and may be placed in position to exert no force on the plow when in operation, and permit it to rise and fall freely and independently of the spring, substantially as and for the purpose specified.

2. In a wheel-plow, in combination with the axle, plow, swinging bail, and lifting-lever connected with the plow by a slotted connection, a spring connected with the axle or a projection therefrom at one end and at its other end with the lifting-lever, whereby the lifting-lever may be locked in position and the entire force of the spring will be exerted thereon, and none of its force exerted on the plow, substantially as and for the purpose specified.

3. In combination with the axle, swinging bail having a slotted standard, G, and the lifting-lever having its arm $e'$ pivoted in said slotted standard, a spring, H, connected at one end with the axle or a projection therefrom and at its other end with the distal end of the arm $e'$, substantially as and for the purpose specified.

4. In combination with the axle, swinging bail, plow, and lifting-lever loosely connected with the bail by a slotted connection, a spring adapted to be locked from action on the plow by the lifting-lever in one position, and permitted to act in raising the plow with the lifting-lever in other positions, substantially as and for the purpose specified.

5. In combination with the axle, plow, swinging bail, and lifting-lever having an arm, $e'$, connected with the plow, a spring adapted to act on the arm $e'$, and thereby on the plow, substantially as and for the purpose specified.

In testimony whereof I affix my signature in presence of two witnesses.

WILLIAM H. WILDE.

Witnesses:
  D. F. CHIDESTER,
  H. L. BENSON.